May 21, 1968
J. FRALEIGH
3,383,740
SAFETY CATCH
Filed Nov. 4, 1966
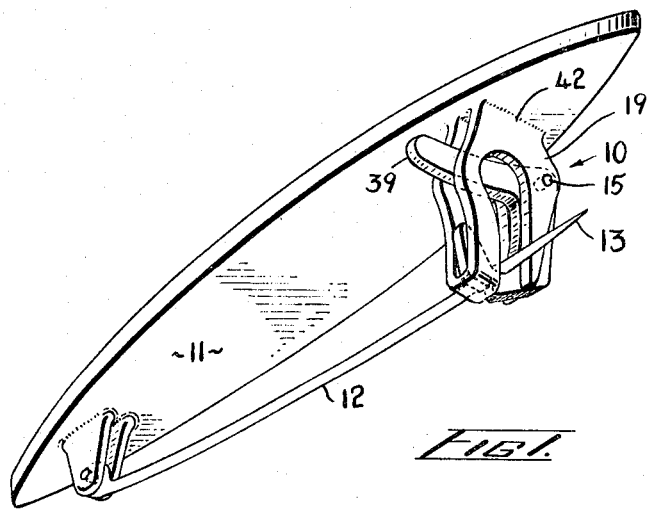
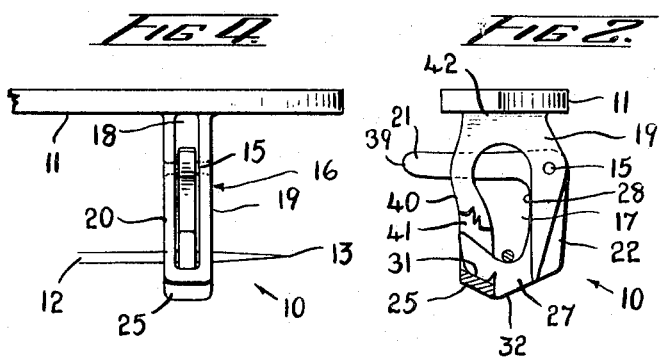
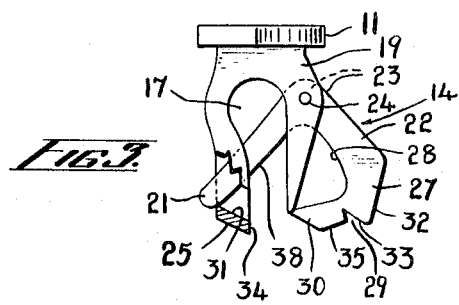
INVENTOR
JONATHAN FRALEIGH
BY Frank J. Pope
ATTORNEY United States Patent Office 3,383,740
Patented May 21, 1968

3,383,740
SAFETY CATCH
Jonathan Fraleigh, 1977 Yonge St.,
Toronto, Ontario, Canada
Filed Nov. 4, 1966, Ser. No. 592,187
1 Claim. (Cl. 24—157)

ABSTRACT OF THE DISCLOSURE

A safety catch having a Y-shaped catch and a pin mounted to a base, the pin being pivotally fastened and so positioned that it may rotate out of and into engagement with the catch between he limbs thereof. The catch has a generally V-shaped guard pivotally mounted to one limb. A first arm of the guard permits the guard to be manually rotated and a second arm frictionally engages with the other limb of the catch and serves as an obstruction to prevent the pin, when between the limbs of the catch, from rotating out of engagement with the catch. To permit the easy opening of the catch, the second arm is notched and yields when force is applied to the first arm.

---

This invention relates in general to a safety catch for a pin stem and more particularly to a safety catch having an improved locking and closing means.

It is common in known safety catches for holding pin stems to provide a closing and locking means which necessitate the insertion of the pin stem in a slot in the safety catch and then closing the opening at the top of the slot with the guard member. The guard member is often not held resiliently in the closed position and can be inadvertently opened easily. It is therefore desirable to provide a safety catch which is constructed to be automatically closed and locked by the positioning of the pin stem in the catch and which is provided with a locking means that will hold the guard member rigidly in the closed position.

An object of this invention is to provide for resiliently holding a swingable locking member in an improved construction of a safety catch which is constructed to be automatically closed and locked by the positioning of the pin in the safety catch.

Another object of my invention is to provide a safety catch wherein a swingable locking member may be readily moved to the closed position but it is much harder to be moved to the open position as the outward swinging movement of the pin will tend to more effectively lock the pin within the catch thereby effectually preventing accidental opening of the catch.

The improved safety catch may be described in connection with an article of jewellery but it is to be understood that may invention applies to articles of all types wherein the invention can be used. Also for the purpose of clarity and simplicity the improved closing and locking means is considered in connection with a guard member pivotally mounted on the body portion of the catch.

A safety catch for the pin stem comprising: a body portion with a base defining a pin receiving slot and a guard receiving slot at an angle to each other, said body portion having stud members projecting upwards from said base, a keeper member connecting the top of two adjacent stud members; a rotatable guard member pivotally mounted in said guard receiving slot, said guard member having a lever arm and a retaining arm at an angle to each other; said lever arm positioned in said pin receiving slot in an open position to engage the pin stem when inserted into the pin receiving slot and adapted to cause the retaining means to move over the opening of the pin receiving slot with the inward motion of inserting the pin to a closed position, and a bill portion associated with said retaining means adapted to be frictionally engaged by said keeper member in the closed position to hold the retaining arm over the opening of the pin receiving slot.

Other objects and a fuller understanding of the invention may be had by referring to the following description and claims, taken in conjunction with the accompanying drawings in which:

FIGURE 1 is a perspective view of a bar pin with a pin stem secured in a safety catch with the improved construction;

FIGURE 2 is an enlarged view of a side elevation partly in section of the safety catch with the guard member in the closed position locking the pin in the slot;

FIGURE 3 is an enlarged view of a side elevation partly in section of the safety catch with the guard member in the open position allowing the pin stem to be inserted into the slot of the safety catch; and FIGURE 4 is an enlarged end view of the safety catch with the guard member in the closed position locking the pin in the slot.

With reference to the drawings, the invention is illustrated, as shown in FIGURE 1, as being incorporated in a safety catch 10 mounted on and positioned at one end of a pin bar 11. At the other end of the bar 11 there is swingably mounted a pin stem 12 where its pointed end 13 is introduced into the safety catch 10 when in the open position. As illustrated, the safety catch 10 is formed from two sidewalls 19 and 20 forming a body portion 16 having a base 42 adapted to be soldered or otherwise secured to the bar 11. The catch is bifurcated longitudinally of its length to provide a pin receiving slot 17 to receive the end 13 of the pin 12. The bifurcations extend upwardly from the base 42 to the outermost part of the body portion 16. A keeper member 25 joins two of the formed studs 40 and 41, of the sidewalls 19 and 20 respectively, on their outer ends. The keeper member 25 is adapted to provide an engaging means 31 for the novel locking and securing means 30 on a guard member 14 to hold the pin receiving slot 17 securely closed against accidental movement.

The guard member 14 is pivotally mounted by a pivot or pin 15 in an opening 24 in the body portion 16 of the catch 10 which is also slotted traversely at 18 for reception of the guard member 14. The guard member 14 comprises two arms, a lever arm 21 and a hook arm 22 linked together at a junction 23 with an opening 24 therein for the pivot pin 15. When the guard member 14 is in the open position, the lever arm 21 sits diagonally across the slot 17 whereby the entering movement of the pin stem 12 acts on the top edge 38 of the lever arm 21 so that a continued inward pressure of the pin 12 on the lever arm 21 causes it to move towards the pin bar 11 in the traverse slot 18. The hook arm 22 will also be moved to the closed position, as shown in FIGURE 2, with the pin end 13 under the hook arm 22. The lever arm 21 cannot rotate upwards past the keeper member 25 joining the sidewalls 19 and 20. The lever arm 21 in the closed position extends horizontally from the pivot pin 15 with a protruding end 39 extending just beyond the surface of the stud 40 whereby it may be easily engaged by the finger or nails of the user for moving the guard member 14 to the open position.

The hook arm 22 of the guard member extends upwardly from the junction 23 and the pivot pin 15 so that in the open position, as shown in FIGURE 3, the hook portion 27 (which will cover the slot 17 in the closed position), is not in the slot 17 to hamper the insertion of the pin 12. The inner edge 28 of the hook arm 22 is rounded in the hook portion 27 and engages the pin stem 12 when the guard member 14 is in the closed position.

The hook portion 27 has a bill portion 30 at its end adapted to lie within the boundaries of the studs 40 and 41 and also the keeper member 25 in the closed position. The top surface 35 of the bill portion 30 is adapted to register with the inner diagonal surface 31 of the keeper member 25. The top surface 32 of the hook portion 27 has an abutment 33 and a notch 29 cut in it at the point where the bill portion 30 begins, whereby the abutment 33 is adapted to register with the end surface 34 of the keeper member 25 in the closed position to prevent further rotation of the guard member 14. By this construction, it will be seen that the hook arm 22 will be frictionally held against accidental movement as the top surface 35 of the bill portion 30 will be frictionally held against the inner surface 31 of the keeper member 25. If the pin stem 12 in the slot 17 exerts an opening strain on the inner edge 28 of the hook portion 27, by the construction of the bill portion 30, the hook arm 22 is prevented from springing and yielding, thereby resisting the opening motion of the pin stem 12. When the outward pressure is exerted, the bill portion 30 abuts on the inner surface 31 of the keeper member 25 and the hook arm 22 is prevented from yielding and opening the top of the slot 17.

The pivot pin 15 associated with the opening 24 in the guard member 14 is positioned to the side of the slot 17 adjacent the bottom portion 36 of the slot 17 and the guard member 14 is affixed to and mounted thereon.

When the guard member 14 is in the open position, the same is moved around the pin 15 to the closed position by the action of the pin stem 12 on the top edge 38 of the lever arm 21. The hook arm 22 owing to the shape of the bill portion 30 is permitted to yield quite readily in contacting with the inner surface 31 of the keeper member 25.

When it is desired to release the pin stem 12 from within the safety catch 10, the finger or nail of the user is inserted under the end 39 of the lever arm 21 and pressure exerted outwardly away from the bar 11. Such pressure will swing the lever arm 21 towards the keeper member 25 and will disengage the top surface 35 of the bill portion 30 from the inner diagonal surface 31 of the keeper member 25 as the bill portion 30 will bend forward slightly permitting it to pass out of contact. The hook portion 27 will be rotated to the open position so as to open the top of the slot 17 to allow the pin stem 12 to be ejected therefrom by the lever arm 21.

A feature of the invention is that the keeper member 25 is shaped so that its inner surface 31 is sloped downwardly to the outer edge of the keeper member. The inner surface 31 prevents the lever arm 21 from rotating completely out of the slot 17 and also resiliently holds the top surface 35 of the bill portion 30 in the closed position to prevent the catch from opening inadvertently. The keeper member 25 has a more rigid construction than any other known catches and constant contact with the hook portion 27, and bill portion 30 of the hook arm 22 does not loosen or weaken the different parts due to friction.

It will be obvious to those skilled in the art that various changes may be made without departing from the spirit of the invention. For example, instead of forming the catch with a slot open at its top or outer edge, the slot may be positioned to open in a direction towards the base. Therefore the invention is not limited to what is shown and discussed in the specification but only as indicated in the appended claim.

What I claim is:

1. A safety catch for a pin stem comprising: a body portion with a base defining a pin receiving slot and a guard receiving slot at an angle to each other, said body portion having stud members projecting upwards from said base, a keeper member connecting the top of two adjacent stud members, a rotatable guard member pivotally mounted in said guard receiving slot, said guard member having a lever arm and a retaining arm at an angle to each other, said lever arm positioned in said pin receiving slot in an open position adapted to engage the pin stem when inserted into the pin receiving slot and adapted to cause the retaining means to move over the opening of the pin receiving slot with the inward motion of inserting the pin to the closed position, and a bill portion associated with said retaining means adapted to be frictionally engaged by said keeper member in the closed position to hold the retaining arm over the opening of the pin receiving slot, said keeper member being adapted to limit the rotatable movement of the lever arm in the open position and adapted to prevent further rotation of the retaining arm in the closed position, the outer surface of the bill portion having a notch therein extending toward the pin stem when positioned within the catch providing a stop shoulder engageable with the keeper member to prevent said further rotation of the retaining arm in the closed position and weakening the said bill portion sufficiently to permit a slight yielding thereof adjacent the notch against the bias of a retained pin stem necessary to facilitate opening of the catch, said lever arm having an end extending from the guard receiving slot in the closed position of the catch functioning as an operator to disengage said bill portion from said keeper member with the upward motion of said end and ejecting said pin stem from the pin receiving slot when moved from the closed position to the open position.

References Cited

UNITED STATES PATENTS

| | | | |
|---|---|---|---|
| 681,393 | 8/1901 | Hawver | 24—157 |
| 712,330 | 10/1902 | Pingel | 24—157 |
| 986,381 | 3/1911 | Grasmuk | 24—157 |

DONALD A. GRIFFIN, *Primary Examiner.*